(12) United States Patent
Engelkes et al.

(10) Patent No.: US 9,190,108 B2
(45) Date of Patent: Nov. 17, 2015

(54) CONTAMINATION REDUCTION HEAD FOR MEDIA

(71) Applicant: Seagate Technology LLC, Cupertino, CA (US)

(72) Inventors: Vincent Engelkes, Maple Grove, MN (US); David J. Ellison, Minneapolis, MN (US); Timothy W. Stoebe, Minnetonka, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/570,351

(22) Filed: Dec. 15, 2014

(65) Prior Publication Data

US 2015/0179216 A1 Jun. 25, 2015

Related U.S. Application Data

(60) Provisional application No. 61/918,926, filed on Dec. 20, 2013.

(51) Int. Cl.
*G11B 5/00* (2006.01)
*G11B 23/50* (2006.01)
*G11B 25/04* (2006.01)
*G11B 33/14* (2006.01)

(52) U.S. Cl.
CPC ............ *G11B 23/505* (2013.01); *G11B 25/043* (2013.01); *G11B 33/1446* (2013.01)

(58) Field of Classification Search
CPC ...... G11B 5/41; G11B 7/1201; G11B 23/505; G11B 23/50; G11B 7/121; G11B 33/1446
USPC .......................................................... 360/128
See application file for complete search history.

(56) References Cited

U.S. PATENT DOCUMENTS

| | | | |
|---|---|---|---|
| 4,327,387 A | 4/1982 | Plotto | |
| 5,661,618 A * | 8/1997 | Brown et al. | 360/97.11 |
| 5,768,056 A * | 6/1998 | Boutaghou et al. | 360/235.1 |
| 6,249,403 B1 | 6/2001 | Tokisue et al. | |
| 6,822,833 B2 | 11/2004 | Yang et al. | |
| 6,893,966 B2 | 5/2005 | Delamarche et al. | |
| 7,317,594 B2 * | 1/2008 | Nakamura et al. | 360/135 |
| 7,327,535 B2 | 2/2008 | Feng et al. | |

(Continued)

FOREIGN PATENT DOCUMENTS

| | | | |
|---|---|---|---|
| JP | 63064684 A * | 3/1988 | |
| JP | 63251981 A * | 10/1988 | |

(Continued)

OTHER PUBLICATIONS

U.S. Appl. No. 13/938,584 (Rajasekharan, et al.), filed Jul. 10, 2013.

(Continued)

*Primary Examiner* — Will J Klimowicz
(74) *Attorney, Agent, or Firm* — HolzerIPLaw, PC (57) ABSTRACT

A cleaning head for removing contaminants from a data storage media, the cleaning head having a cleaning surface comprising a self-assembled monolayer, with the cleaning surface leading a read/write transducer. The self-assembled monolayer is selected so as to have a terminal functional group that has a high affinity to the contaminant(s) desired to be attracted and/or removed.

16 Claims, 5 Drawing Sheets

(56) References Cited

U.S. PATENT DOCUMENTS

| | | |
|---|---|---|
| 7,357,875 B2 | 4/2008 | Feng et al. |
| 7,746,600 B2 | 6/2010 | Hancer et al. |
| 7,796,356 B1 | 9/2010 | Fowler et al. |
| 7,855,858 B2 | 12/2010 | Hancer et al. |
| 8,518,563 B2 | 8/2013 | Jones et al. |
| 2004/0021987 A1 | 2/2004 | Yotsuya et al. |
| 2004/0223256 A1* | 11/2004 | Feng et al. ............... 360/122 |
| 2007/0042154 A1 | 2/2007 | Hancer et al. |
| 2007/0196673 A1 | 8/2007 | Hancer et al. |
| 2007/0224452 A1 | 9/2007 | Sasa et al. |
| 2008/0285173 A1* | 11/2008 | Feng et al. ............... 360/122 |
| 2009/0046388 A1* | 2/2009 | Ogata et al. ............ 360/234.3 |
| 2009/0073610 A1 | 3/2009 | Ohtani et al. |
| 2009/0310257 A1* | 12/2009 | Musashi et al. ......... 360/234.3 |
| 2010/0190034 A1* | 7/2010 | Ikai et al. .................. 428/810 |
| 2011/0205665 A1 | 8/2011 | Jones et al. |
| 2012/0052329 A1* | 3/2012 | Gao et al. .................. 428/827 |
| 2015/0002960 A1* | 1/2015 | Stoebe et al. ............ 360/235.1 |
| 2015/0015996 A1* | 1/2015 | Rajasekharan et al. .... 360/235.3 |
| 2015/0020379 A1* | 1/2015 | Engelkes et al. .......... 29/603.01 |
| 2015/0103444 A1* | 4/2015 | Kunkel et al. ............ 360/235.3 |

FOREIGN PATENT DOCUMENTS

| | | | |
|---|---|---|---|
| JP | 10334436 A | * | 12/1998 |
| KR | 2003012535 A | * | 2/2003 |

OTHER PUBLICATIONS

U.S. Appl. No. 14/055,143 (Kunkel, et al.), filed Oct. 16, 2013.

Zhang, et al., "Growth of Self-Assembled Monolayer on Tetrahedral Amorphous Carbon Film Coated Magnetic Head" Surface & Coatings Technology 202, pp. 3451-3456 (2008).

* cited by examiner

CONTAMINATION REDUCTION HEAD FOR MEDIA

CROSS-REFERENCE TO RELATED APPLICATION(S)

This application is a non-provisional application that claims priority to U.S. provisional application 61/918,926 filed Dec. 20, 2013, the entire disclosure of which is incorporated herein by reference for all purposes.

BACKGROUND

Hard disc drives are common information storage devices having a series of rotatable discs that are accessed by magnetic reading and writing elements. These data elements, commonly known as transducers, or merely as a transducer, are typically carried by and embedded in a slider that is held in a close relative position over discrete data tracks formed on a disc to permit a read or write operation to be carried out.

As distances between the slider and the disc decrease, due to the ever-growing desire to reduce the size of the disc drive and to pack more data per square inch, the potentially negative impact due to contamination on the slider increases. Unwanted contaminants on the slider can adversely affect fly height behavior, such as with elevated or decreased fly height, create fly asymmetry in roll or pitch character, produce excessive modulation, and even result in head-disc crashing or contact, all possibly due to contaminant build up on the slider. All of these mechanisms result in degraded performance of the read or write operation of the head (e.g., skip-writes, modulated writers, weak writes, clearance stability and settling, and incorrect clearance setting).

What is needed is a mechanism to remove and/or control contaminants from between the slider and the disc surface while maintaining acceptable contact sensing between the transducer and the disc.

SUMMARY

One particular implementation described herein is a cleaning head for removing contaminants from a data storage media, the cleaning head having a cleaning surface comprising a self-assembled monolayer, with the cleaning surface leading a read/write transducer.

Another particular implementation described herein is an assembly having a cleaning surface. The assembly comprises data storage media, a read/write head having a transducer and an air-bearing surface (ABS) opposite the media, the head having a leading edge and a trailing edge, and a cleaning surface comprising a self-assembled monolayer, the cleaning surface leading the transducer in respect to the media.

Yet another particular implementation described herein is a method of cleaning a data storage media having a surface. The method includes providing a cleaning surface comprising a self-assembled monolayer, and attracting contaminants from the surface of the data storage media to the self-assembled monolayer by bringing the self-assembled monolayer in close proximity to the surface of the data storage media.

The self-assembled monolayer of the cleaning surface is selected so as to have a terminal functional group that has a high affinity to the contaminant(s) desired to be attracted and/or removed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following detailed description.

BRIEF DESCRIPTIONS OF THE DRAWING

The described technology is best understood from the following Detailed Description describing various implementations read in connection with the accompanying drawings.

DETAILED DESCRIPTION

Hard disc drives are common information storage devices having of a series of rotatable discs that are accessed by magnetic reading and writing elements. These data elements, commonly known as transducers, or merely as a transducer, are typically carried by and embedded in a slider that is held in a close relative position over discrete data tracks formed on a disc to permit a read or write operation to be carried out. As distances between the slider and the disc decrease, due to the ever-growing desire to reduce the size of the disc drive and to pack more data per square inch, the potentially negative impact of any contamination between the slider and the disc increases. Unwanted contaminants can adversely affect fly height behavior of the slider, such as leading to elevated or decreased fly height, fly asymmetry in roll or pitch character, excessive modulation, and head-disc crashing or contact by contaminant build up and accumulation on the slider and/or "bridging" mechanisms between the head and disc. All of these mechanisms result in degraded performance of the read and/or write operation of the head (e.g. skip-writes, modulated writers, weak writes, clearance stability and settling, and incorrect clearance setting).

The present disclosure provides various implementations of devices and methods to remove contaminants from the disc surface. The term "contaminant" refers to any unwanted material or substance present on the storage medium, even if such substance is placed on the article intentionally. For example, in many implementations, lubricants such as hydrocarbon based oils and greases and dioctylphthalate are intentionally applied to the surface of carbon coated discs to improve the flying height of the slider in relation to the disc. Droplets of, or otherwise unattached or "free" lubricant is a contaminant readily removed from the disc surface by the devices and methods of the present disclosure. Contaminants that can be removed by the device include, but are not limited to, free disc lubricants, organic materials (e.g., solvents), silicones, and particulates.

In the following description, reference is made to the accompanying drawing that forms a part hereof and in which is shown by way of illustration at least one specific implementation. The following description provides additional specific implementations. It is to be understood that other implementations are contemplated and may be made without departing from the scope or spirit of the present disclosure.

The following detailed description, therefore, is not to be taken in a limiting sense. While the present disclosure is not so limited, an appreciation of various aspects of the disclosure will be gained through a discussion of the examples provided below.

Figure 1:
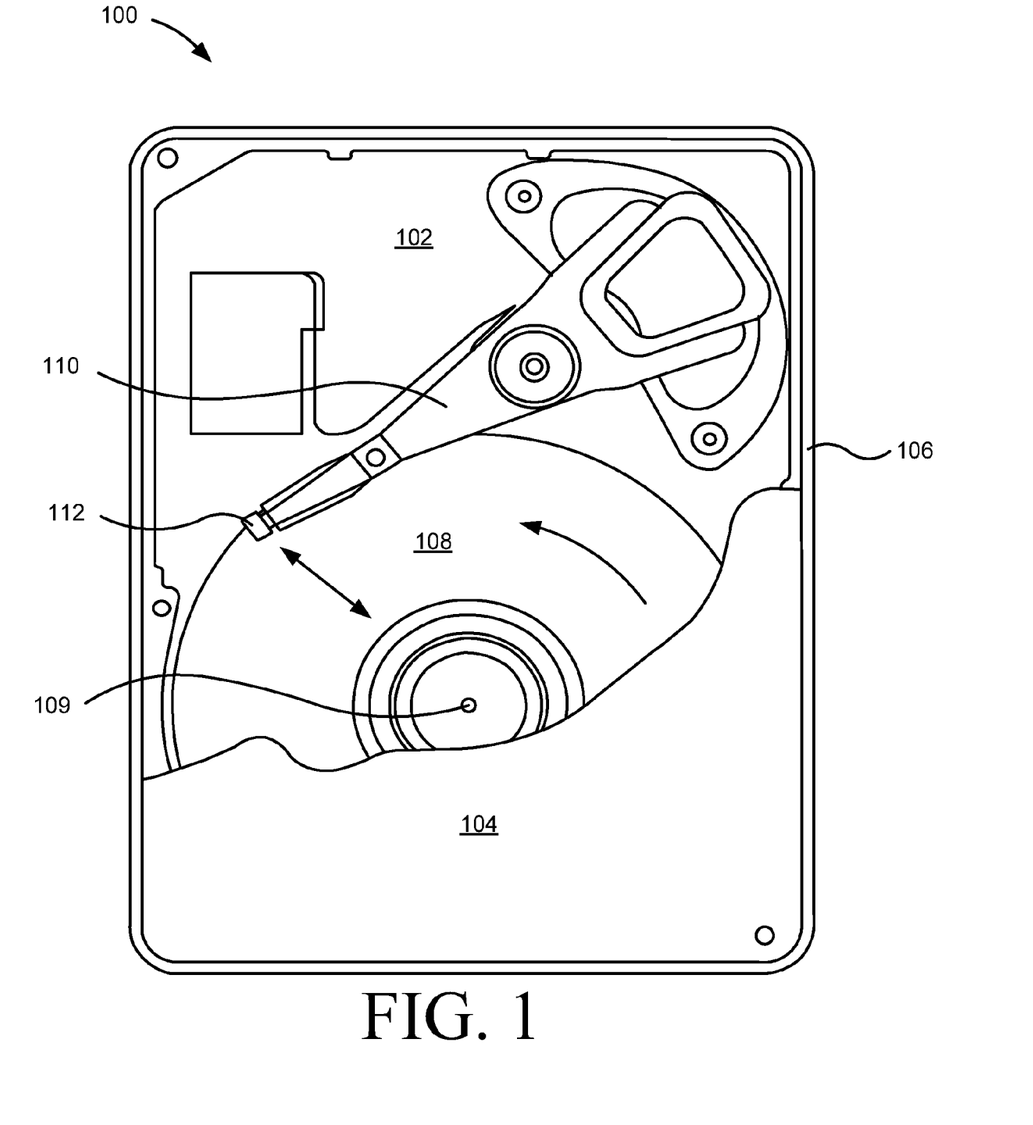
FIG. 1 is a schematic, top plan view of a hard disc drive.

Referring to FIG. 1, an exemplary magnetic disc drive 100 is schematically illustrated. Disc drive 100 includes base 102 and top cover 104, shown partially cut away. Base 102 combines with top cover 104 to form a housing 106, in which is located one or more rotatable magnetic data storage media or discs 108. Magnetic storage media 108 are attached to spindle 109 for co-rotation about a central axis. It should be noted that a pack of multiple discs or media 108 is utilized in some implementations, and only a single disc or medium 108 is used in other implementations. Each disc or medium surface has an associated slider 112 that is mounted adjacent to and in communication with its corresponding disc or media 108. Slider 112 includes a data recording transducer and a data reading transducer (also referred to as read/write heads, transducers, and the like), which read and write data to storage disc or media 108. In the example shown in FIG. 1, an actuator assembly 110, composed of various elements that are known in the field, supports slider 112. The actuator assembly 110 shown in FIG. 1 is of the type known as a rotary moving coil actuator and includes a voice coil motor to rotate actuator assembly 110 with its attached slider 112 to position slider 112 and its read/write transducers over a desired data track along a path between an inner diameter and an outer diameter of disc or media 108.

In accordance with some of the implementations of this disclosure, present in disc drive 100 is a cleaning surface that includes a self-assembled monolayer or SAM, selected with an affinity for a class of contaminants (e.g., an oleophilic SAM for the removal of oil-based contaminants) and often a high surface energy SAM, configured to remove contaminant(s) from media 108 prior to operable interaction of the transducer on slider 112 with media 108. In other implementations of this disclosure, media 108 is brought into operational contact with the cleaning surface prior to assembly of media 108 into disc drive 100.

Figure 2:
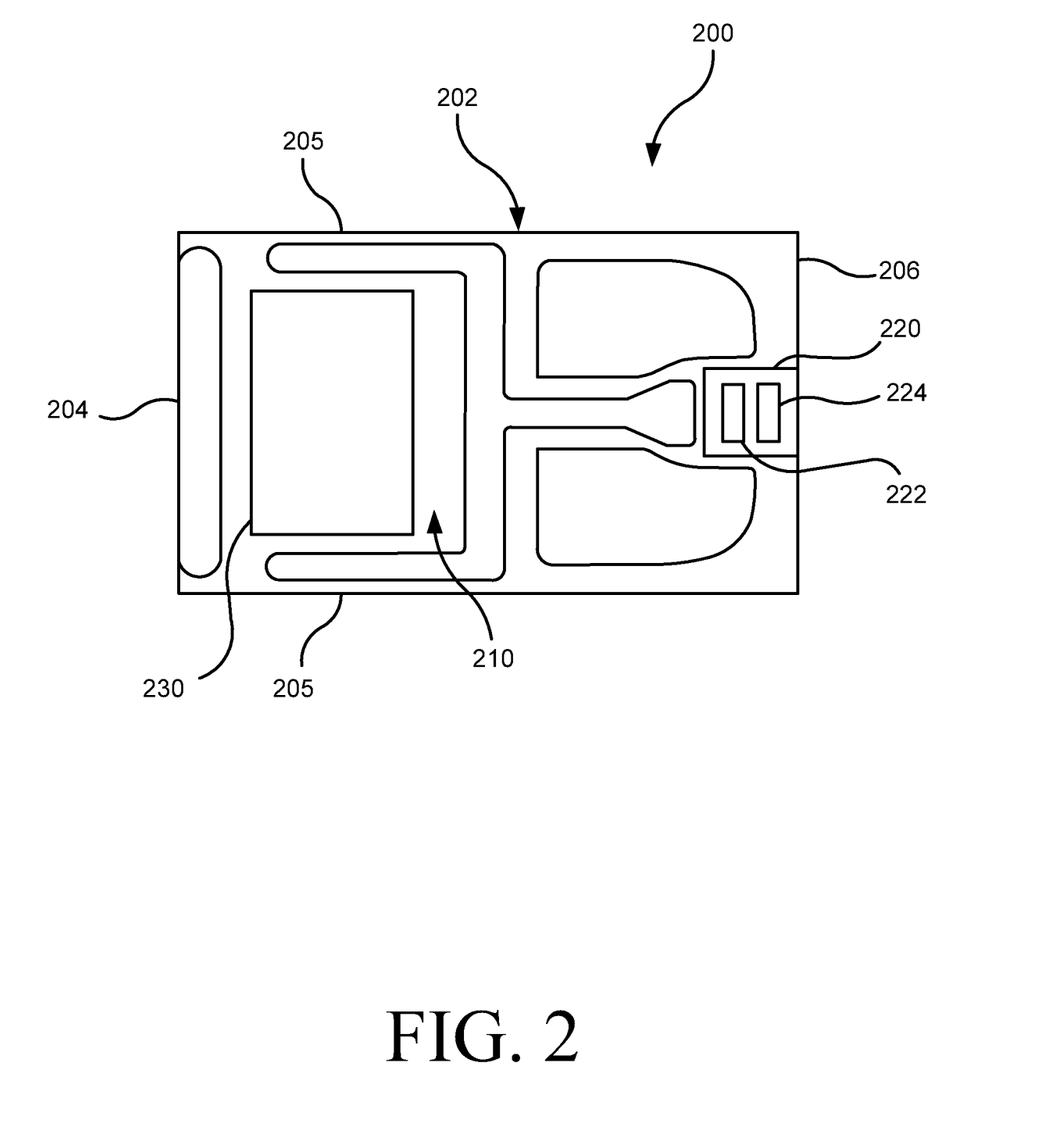
FIG. 2 is a schematic, bottom plan view of a slider showing a transducer and a cleaning surface.

FIG. 2 illustrates an implementation having a cleaning surface present on a slider, upstream of the transducer. A slider 200, enlarged to show various topographical features such as the read head, the write head, the air bearing surface (ABS) or rails, and/or the entire advanced air bearing (AAB) surface, is shown. Slider 200 has an slider body 202 defined by a leading edge 204, a trailing edge 206 and two side edges 205 connecting leading edge 204 and trailing edge 206 of body 202. Slider body 202 has an air bearing surface (ABS) 210 that is the surface of body 202 that is opposite media 108 when slider 200 is incorporated into a disc drive. ABS 210 has a topography designed to control the aerodynamic performance of slider 200 as it flies over a rotating media 108. In particular, ABS 210 includes structural features such as rails, lands, ramps, trenches, depressions and the like that are designed to maximize the air-bearing surface pressure created by the stream of air flowing between ABS 210 and the rotating disc.

Slider 200 includes a transducer 220 that is proximate to or at trailing edge 206 of slider body 202; transducer 220 includes at least one read head 222 and at least one write head 224. In some implementations, transducer 220 is present on the trailing wall of slider body 202.

Although one particular implementation of a slider has been illustrated in FIG. 2, it is understood that the slider may have any number of various alternate configurations of, e.g., topographical features such as rails and trenches, the location of transducer 220, and the arrangement of read head 222 and write head 224.

Provided herein are various implementations of cleaning or wiper devices having a cleaning surface comprising a self-assembled monolayer coating, or SAM coating, the coating configured to accumulate (e.g., coalesce) and remove contaminants from the surface of disc or media 108, prior to operable engagement of read head 222 and write head 224 with media 108. The cleaning surface may be present on the ABS of the slider (e.g., on ABS 210 of slider 200) generally upstream from the transducer, or the cleaning surface may be present as a cleaning bar or head separate from the slider. If the cleaning surface is present as a separate cleaning head, the cleaning head may be supported by the same actuator arm or assembly (e.g., actuator assembly 110 in FIG. 1) as the slider or by a different arm or assembly. In some implementations, the cleaning surface may be in operational contact with the disc surface simultaneously with the reading or writing contact of the transducer.

Returning to FIG. 2, slider 200 includes at least one cleaning surface 230 present on ABS 210 upstream from transducer 220, or in other words, cleaning surface(s) 230 is closer to leading edge 204 than is transducer 220. Cleaning surface(s) 230 occupies at least 25% of the surface area of ABS 210, in some implementations at least 50%, and in other implementations at least 70%. Additionally or alternately, cleaning surface(s) 230 and transducer 220 have a distance therebetween of at least 10 micrometers, in other implementations at least 25 micrometers. With this configuration (i.e., having at least one cleaning surface 230 upstream of transducer 220), when the disc drive is in use, the surface of the media will be cleaned of contaminants by cleaning surface 230 prior to interaction with transducer 220.

Alternately or additionally, cleaning surface(s) 230 may be present on either or both sides of the transducer 220, between transducer 220 and side edge(s) 205 (e.g., laterally in relation to transducer 220). With such a configuration, the surface of media 108 will be cleaned by the cleaning surface(s) 230 prior to interaction with transducer 220 as slider 200 sweeps across media 108.

Figure 3:
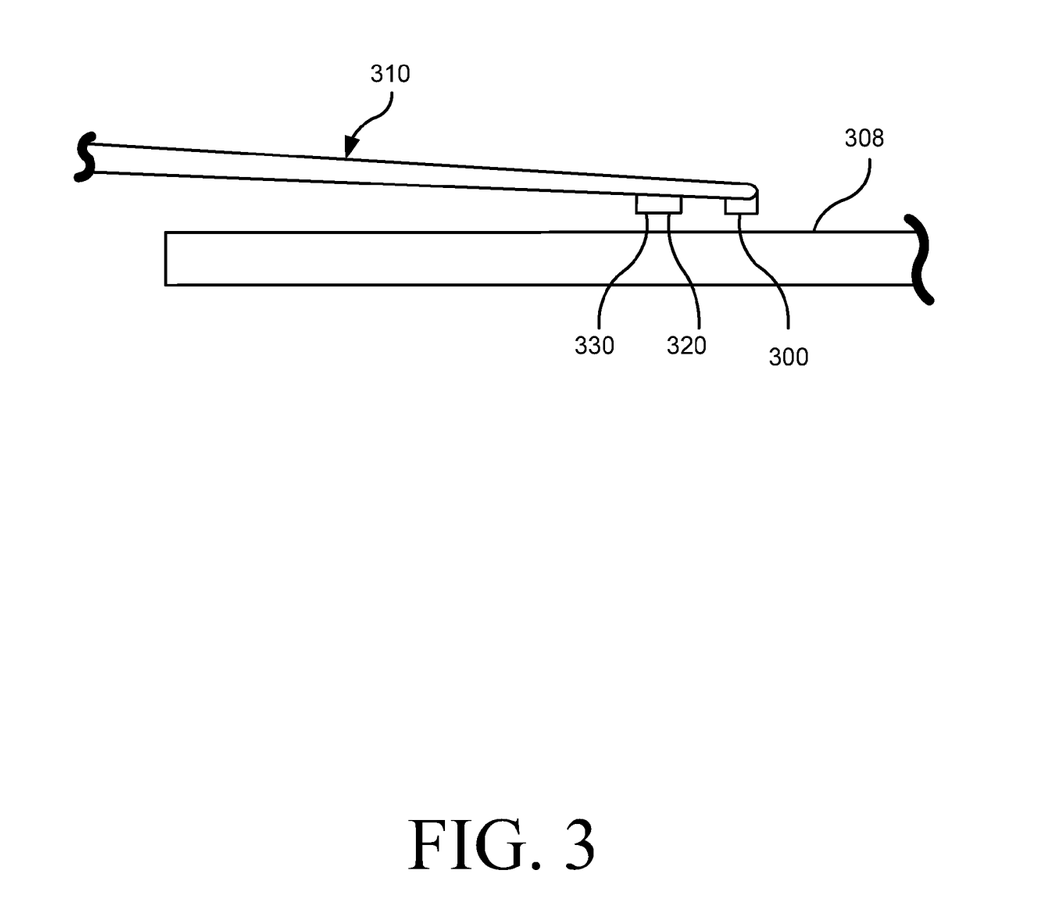
FIG. 3 is a schematic, side plan view of a portion of a hard disc drive.

In another implementation, illustrated in FIG. 3, the cleaning surface is present on a separate slider or head than the transducer. In FIG. 3, an actuator assembly 310 (similar to actuator assembly 110 of FIG. 1) supports slider 300 in relation to disc media 308. Also supported by actuator assembly 310 is a cleaning head 320 having a cleaning surface 330 comprising a self-assembled monolayer. Cleaning head 320 is positioned leading slider 300 by at least 25 micrometers, in some implementations by at least 50 micrometers or even 100 micrometers. Cleaning head 320 can have a working surface size (i.e., the surface of cleaning head 320 that is opposite disc 308) that is the same as, greater than, or less than slider 300. The cleaning surface 330 (i.e., the self-assembled monolayer) may occupy the entire working surface of cleaning head 320 or may be less. When the disc drive is in use, the surface of the media 308 will be cleaned of contaminants by cleaning surface 330 of cleaning head 320 before the contaminated surface can contact the transducer of the slider 300.

Figure 4:
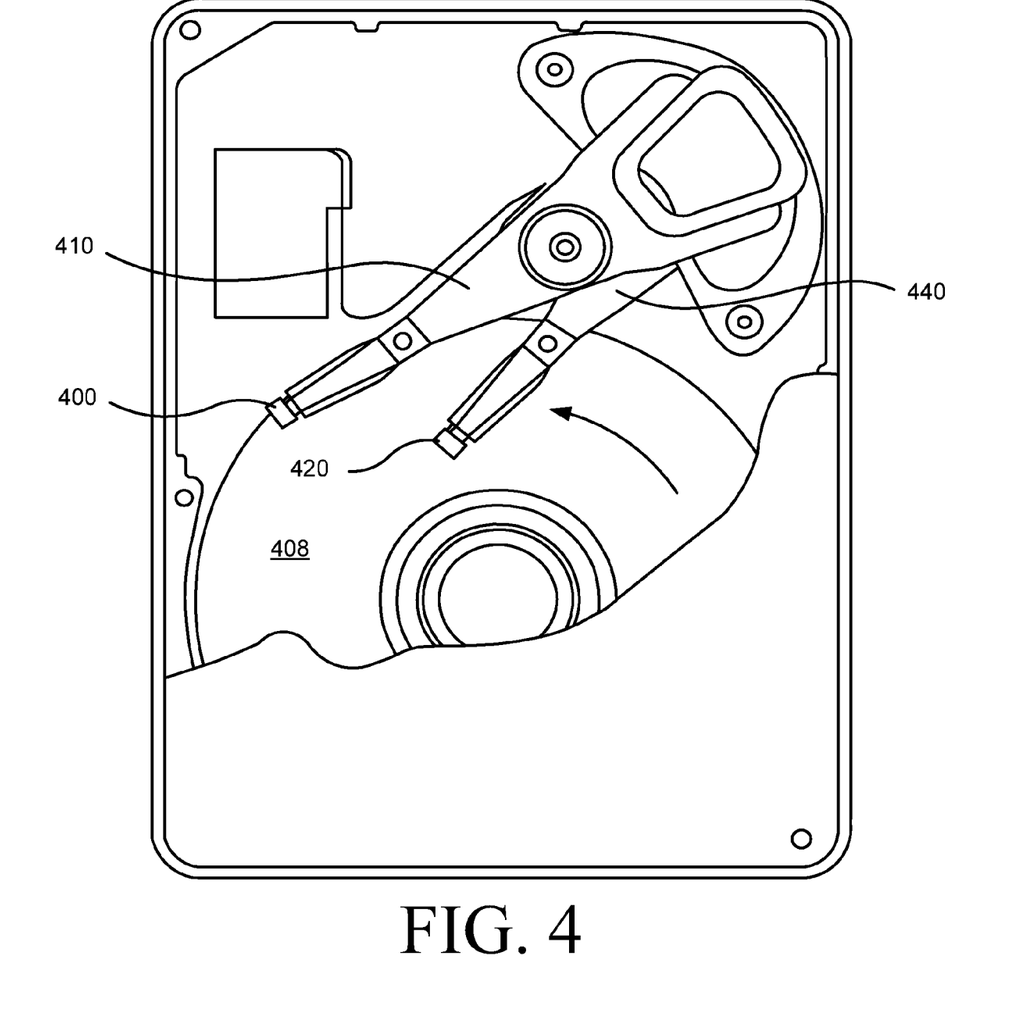
FIG. 4 is a schematic, top plan view of a hard disc drive having a transducer on a first actuator arm and a cleaning surface on a second actuator arm.

In the implementation of FIG. 3, the cleaning surface (i.e., cleaning surface 330) is present on a separate slider or head (i.e., cleaning head 320) than the transducer, which is on slider 300. In FIG. 4, the cleaning surface is supported by an actuator assembly that is different than the actuator assembly that supports the slider with the transducer.

In FIG. 4, an actuator assembly 410 supports slider 400, having a read/write transducer, in relation to disc media 408.

Also present is a cleaning head 420, supported by a second actuator assembly 440, on the leading side of actuator assembly 410; that is, cleaning head 420 operably contacts media 408 before slider 400 contacts that region of media 408. Cleaning head 420 on actuator assembly 440 leads slider 400 on actuator assembly 410 by at least 50 micrometers, in some implementations by at least 100 micrometers. Cleaning head 420 has a working surface (i.e., the surface of cleaning head 420 that is opposite disc 408) having an area or size that is the same as, greater than, or less than slider 400. Cleaning head 420 has a cleaning surface (i.e., the self-assembled monolayer) that occupies the entire working surface of cleaning head 420 or less than the entire working surface. In use, an area on spinning media 408 will be in operably contacted by cleaning head 420 on actuator assembly 440 prior to being operably contacted by slider 400 carried by actuator assembly 410, so that any contamination on media 408 is minimized and preferably removed prior to contact with the transducer of slider 400.

Figure 5:
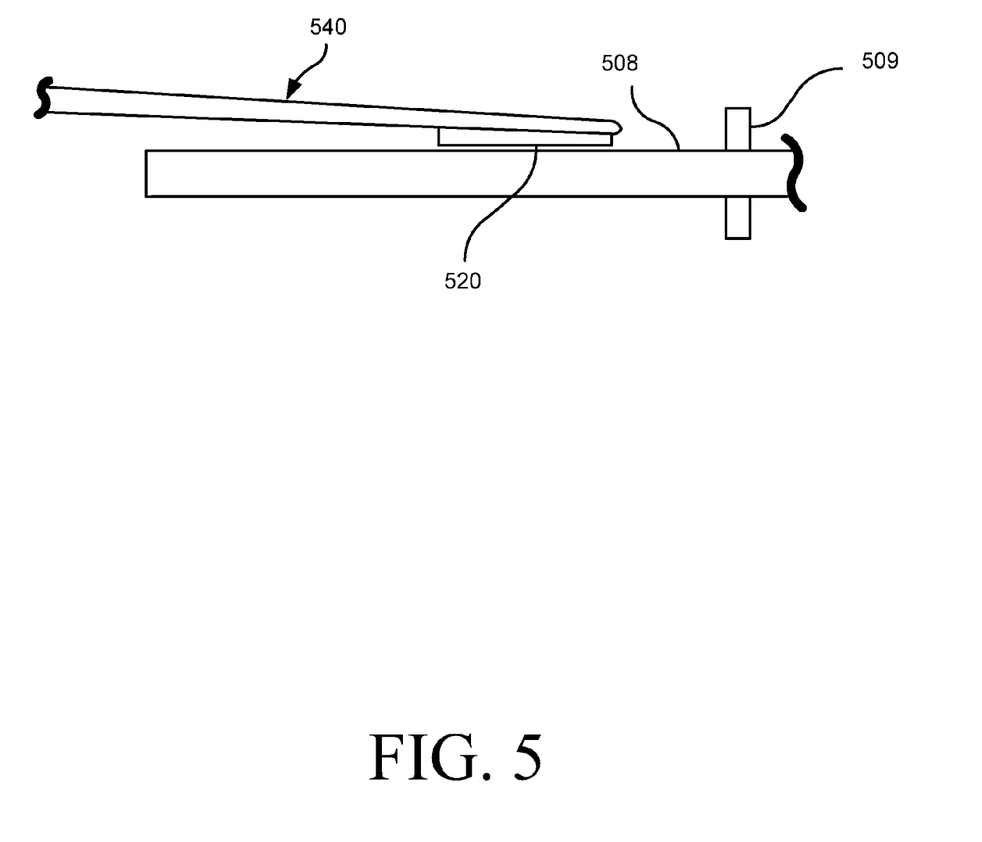
FIG. 5 is a schematic, side view of a memory disc prior to being incorporated into a hard disc drive and a cleaning surface.

In another implementation, illustrated in FIG. 5, the cleaning head is used on the media disc prior to incorporation of the media into a disc drive system (e.g., media disc 108 in disc drive system 100), i.e., before all the elements of the system are assembled. In such an implementation, the cleaning head may be referred to as a wiper bar or the like.

FIG. 5 schematically illustrates a media disc 508 attached to spindle 509 for rotation about a central axis. A cleaning surface is provided on a cleaning wiper bar 520 that is supported by an arm assembly 540. Prior to assembling disc 508 into the disc drive assembly, cleaning wiper bar 520 is operably passed over the surface of disc 508 to remove contaminant(s) that may be present thereon. Alternately or additionally, cleaning wiper bar 520 is operably passed over the surface of disc 508 to remove contaminant(s) that may be present thereon after disc 508 has been seated in the drive housing (e.g., such as housing 106 of FIG. 1). After disc 508 is cleaned of contaminants, wiper bar 520 is removed from disc 508 and is not present within the eventual disc drive assembly.

In each of the implementations described above, and in variations thereof, contaminants (e.g., oil(s), moisture, particles) are accumulated (e.g., coalesced) on the cleaning surface due to the SAM coating. Often, when a sufficiently large droplet coalesces, the droplet may fall off from the cleaning surface and be removed from the immediate area of the media disc by the air currents caused by the rotating media disc. In other situations, the amount of liquid contaminant is sufficiently small that no droplet forms during the working life of the disc drive assembly. In some implementations, the cleaning surface or cleaning head also includes an adsorbent or absorbent material, such as a zeolite, to hold and/or retain the contaminants.

Occasionally, the cleaning surface can be refreshed or recharged; that is, the accumulated contaminant(s) are removed and/or new SAM material is applied to the cleaning surface. This may be done, for example, during scheduled maintenance of the disc drive assembly, or when the assembly is repaired or otherwise maintained or serviced. Accumulated contaminants can be removed, for example, under high heat or by a plasma process. After the contaminants are removed, the SAM material can be replenished if needed. For example, after attracting contaminants on the cleaning surface, the cleaning surface can be recharged by subsequent cleaning or reactivation of the cleaning surface through either (for example) solution or plasma based cleaning processes, and then reapplication of the SAM coating.

In each of the implementations described above, and in variations thereof, the cleaning surface comprises a self-assembled monolayer. The terms "self-assembled monolayer" and "SAM" as used herein refer to a thin monolayer of surface-active molecules are provided (e.g., adsorbed and/or chemisorbed) on the surface (i.e., the cleaning surface).

Self-assembled monolayer materials, or SAM materials, are widely available in a range of surface energies and can be readily applied to a desired surface (i.e., to the cleaning surface). Self-assembled monolayer materials can have a low surface energy or a high surface energy. The term "low surface energy" and variations thereof, as used herein, refers to the tendency of a surface to resist wetting (high contact angle) or adsorption by other unwanted materials or solutions; whereas, "high surface energy" refers to the tendency of a surface to increase or promote wetting (low contact angle) or adsorption by other unwanted materials or solutions. In a low surface energy material, such as a low energy SAM, the functional terminal groups of the molecules are chosen to result in weak physical forces (e.g., Van der Waals forces) between the coating and a liquid and thus allow for partial wetting or no wetting of the resulting coating (i.e., a high contact angle between the liquid and the coating). Conversely in a high surface energy material, such as a high energy SAM, the functional terminal groups of the SAM molecules are chosen to result in a stronger molecular force between the coating and a liquid and allow for full wetting of the of the liquid (i.e., a very small contact angle between the liquid and the coating). Values that are typically representative of "low surface energy" are in the range of 5-30 dyne/cm and high surface energy materials are relatively higher than this range, typically anything greater than 30 dyne/cm. An example of a high energy self-assembled monolayer or SAM material includes 3-aminopropyltrimethoxysilane. Examples of low energy self-assembled monolayer or SAM materials include perfluorodecyltricholorsilane (FDTS) and other fluorinated organosilane derivatives.

The SAM material for the cleaning surface can be selected to remove and/or attract a particular contaminant or type of contaminant. Examples of contaminants that are common in disc drive assembles include alumina ($Al_2O_3$), talc, and hydrocarbons. For example, the alkylsilane class of SAM materials, such as n-decyltrichlorosilane and dodecyltrichlorosilane (DTS), can be used to remove hydrocarbon contaminants such as sebacate and blasocut oils (oils often present in spindle bearings), paraffins (often present in the media, adhesives, and plastics present within the disc drive housing), and tooling oil (which might be residual from the assembly process of the disc drive). A polar (strong fixed dipole) SAM, such as 3-aminopropyltrimethoxysilane, can be used to remove (e.g., adsorb or absorb) polar contaminants such as acidic gases (e.g., SOx, NOx), surfactants (soap) from upstream cleaning processes for the media, polar or statically charged particles (e.g., alumina particles, metal oxide particles, talc particles) and any moisture that might be present on the media.

The precursor compound for forming the SAM contains molecules having a head group, a tail group, and functional end group. Common head groups include thiols, silanes, phosphonates, etc. SAMs are created by chemisorption of the head groups onto the surface area material (i.e., the cleaning surface) from either a vapor or liquid phase, by processes such as immersion, spraying, vapor deposition (e.g., chemical vapor deposition), vacuum deposition, etc. The head groups closely assemble on the material with the tail groups extending away from the material.

The precursor compound of the SAM may be present in any conventionally-used organic solvent, water, fluid, or any mixture thereof. Examples of suitable organic solvents may include, but are not limited to, alcohols (e.g., methyl alcohol, ethyl alcohol, n-propyl alcohol, isopropyl alcohol, n-butyl alcohol, sec-butyl alcohol, t-butyl alcohol, isobutyl alcohol, and diacetone alcohol); ketones (e.g., acetone, methylethylketone, methylisobutylketone); glycols (e.g., ethyleneglycol, diethyleneglycol, triethyleneglycol, propyleneglycol, butyleneglycol, hexyleneglycol, 1,3-propanediol, 1,4-butanediol, 1,2,4-butantriol, 1,5-pentanediol, 1,2-hexanediol, 1,6-haxanediol); glycol ethers (e.g., ethyleneglycol dimethyl ether, and triethyleneglycol diethyl ether); glycol ether acetates (e.g., propylene glycol monomethyl ether acetate (PGMEA)); acetates (e.g., ethylacetate, butoxyethoxy ethyl acetate, butyl carbitol acetate (BCA), dihydroterpineol acetate (DHTA)); terpineols (e.g., trimethyl pentanediol monoisobutyrate (e.g., "TEXANOL" from Eastman Chemical Co.)); dichloroethene (DCE); chlorobenzene; and N-methyl-2-pyrrolidone (NMP).

The concentration of the precursor compound in the solution may be determined by those skilled in the art according to the intended applications and purposes and may be in the range of about 5 to about 20 mM. An immersion step may be performed without particular limitation and may be carried out at room temperature for about 20 to 120 minutes. Similarly, other methods (e.g., vacuum deposition, vapor deposition, etc.) may be carried out by conventional means.

An example of a commercially available low surface energy SAM is 1H,1H,2H,2H-perfluorodecyltrichlorosilane (alternately, heptadecafluoro-1,1,2,2-tetrahydro-decyl-1-trichlorosilane) [CAS: 78560-44-8], of course, other low surface energy SAM materials could be used. In general the class of fluorinated organosilane derivatives would work as low energy SAM materials. Other examples of commercially available low surface energy SAMs include: trifluoropropyltrimethoxysilane, heneicosafluorododecyltrichlorosilane, nonafluorohexyltrimethoxysilane, methyltrichlorosilane, ethyltrichlorosilane, propyltrimethoxysilane, hexyltrimethoxysilane, n-octyltriethoxysilane, n-decyltrichlorosilane, dodecyltrichlorosilane, and octadecyltrichlorosilane.

An example of a commercially available high surface energy SAM is (3-aminopropyl)-trimethoxysilane [CAS: 13822-56-5]. Of course, other high surface energy SAM materials could be used. The general class of organosilanes with amine, alcohol, or mercapto substituents would provide for a high surface energy SAM, relative to the above. Some commercially available examples include: (3-Mercaptopropyl)trimethoxysilane, methyl 11-[dichloro(methyl)silyl]undecanoate, acetoxyethyltrichlorosilane, and vinyltriethoxysilane.

Examples of commercially available oleophilic SAM materials fall within the general class of 1-18 carbon alkylsilanes with a hydrolyzable reactive group (e.g., halides such as F, Cl, Br, and I, and alkoxys such as methoxy, ethoxy, and propoxy). Such chemicals are readily available, for example, from Gelest and Sigma Aldrich, and include methyltrichlorosilane, ethyltrichlorosilane, propyltrimethoxysilane, hexyltrimethoxysilane, n-octyltriethoxysilane, n-decyltrichlorosilane, dodecyltrichlorosilane, and octadecyltrichlorosilane. In addition to the alkyl class, other functional SAMs, such as the following, are also are advantageous: 3-aminopropyltrimethoxysilane, methyl 11-[dichloro(methyl)silyl]undecanoate, acetoxyethyltrichlorosilane, vinyltriethoxysilane, and nonafluorohexyltrimethoxysilane.

Any of the SAM materials described above can be used to form a cleaning surface, either on a cleaning head or on a read/write head. The SAM material is selected to have a terminal functional group that has a high affinity to the contaminants desired to be removed from the media surface.

As described above and illustrated in the figures, the present disclosure is directed to various implementations for managing the accumulation of contaminants, including lubricant and other organic contaminants, on the media surface prior to operable engagement of the transducer with the media surface.

The above specification and examples provide a complete description of the structure and use of exemplary implementations of the invention. The above description provides specific implementations. It is to be understood that other implementations are contemplated and may be made without departing from the scope or spirit of the present disclosure. The above detailed description, therefore, is not to be taken in a limiting sense. While the present disclosure is not so limited, an appreciation of various aspects of the disclosure will be gained through a discussion of the examples provided.

Unless otherwise indicated, all numbers expressing feature sizes, amounts, and physical properties are to be understood as being modified by the term "about," whether or not the term "about" is immediately present. Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass implementations having plural referents, unless the content clearly dictates otherwise. As used in this specification and the appended claims, the term "or" is generally employed in its sense including "and/or" unless the content clearly dictates otherwise.

Spatially related terms, including but not limited to, "bottom," "lower", "top", "upper", "beneath", "below", "above", "on top", "on," etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above or over those other elements.

Since many implementations of the invention can be made without departing from the spirit and scope of the invention, the invention resides in the claims hereinafter appended. Furthermore, structural features of the different implementations may be combined in yet another implementation without departing from the recited claims.

What is claimed is:

1. A cleaning head for removing contaminants from a data storage media and accumulating the contaminants on the cleaning head, the cleaning head having a cleaning surface comprising a high surface energy self-assembled monolayer having a surface energy greater than 30 dyne/cm, with the cleaning surface leading a read/write transducer.

2. The head of claim 1, wherein the cleaning surface leads the read/write transducer by at least 25 micrometers.

3. The head of claim 1, wherein the cleaning surface is on a head that has the read/write transducer.

4. The head of claim 1, wherein the self-assembled monolayer comprises an alkylsilane.

5. The head of claim 1, wherein the self-assembled monolayer is oleophilic.

6. The head of claim 1, wherein the self-assembled monolayer comprises an organosilane with an amine, alcohol, or mercapto substituent.

7. An assembly comprising:
data storage media;
a read/write head having a transducer and an air-bearing surface (ABS) opposite the media, the head having a leading edge and a trailing edge; and
a cleaning surface comprising a high surface energy self-assembled monolayer having a surface energy greater than 30 dyne/cm, the cleaning surface leading the transducer in respect to the media.

8. The assembly of claim 7, wherein the self-assembled monolayer comprises an alkylsilane.

9. The assembly of claim 7, wherein the self-assembled monolayer is oleophilic.

10. The assembly of claim 7, wherein the self-assembled monolayer comprises an organosilane with an amine, alcohol, or mercapto substituent.

11. The assembly of claim 7, wherein the cleaning surface is on the read/write head.

12. The assembly of claim 7, wherein the read/write head is supported by a first actuator assembly and the cleaning surface is supported by a second actuator assembly.

13. The assembly of claim 7, wherein the read/write head and the cleaning surface are supported by a first actuator assembly.

14. A slider having a leading edge, a trailing edge and an air-bearing surface (ABS), the slider comprising a read/write transducer and a cleaning surface comprising a high surface energy self-assembled monolayer having a surface energy greater than 30 dyne/cm closer to the leading edge than the read/write transducer, the cleaning surface leading the read/write transducer by at least 25 micrometers.

15. The slider of claim 14, wherein the cleaning surface occupies at least 25% of the ABS.

16. The slider of claim 14, wherein the cleaning surface occupies at least 50% of the ABS.

\* \* \* \* \*